Jan. 9, 1968 M. L. CRIPE 3,362,297
FLUID PRESSURE SERVOMOTOR
Filed Sept. 26, 1966
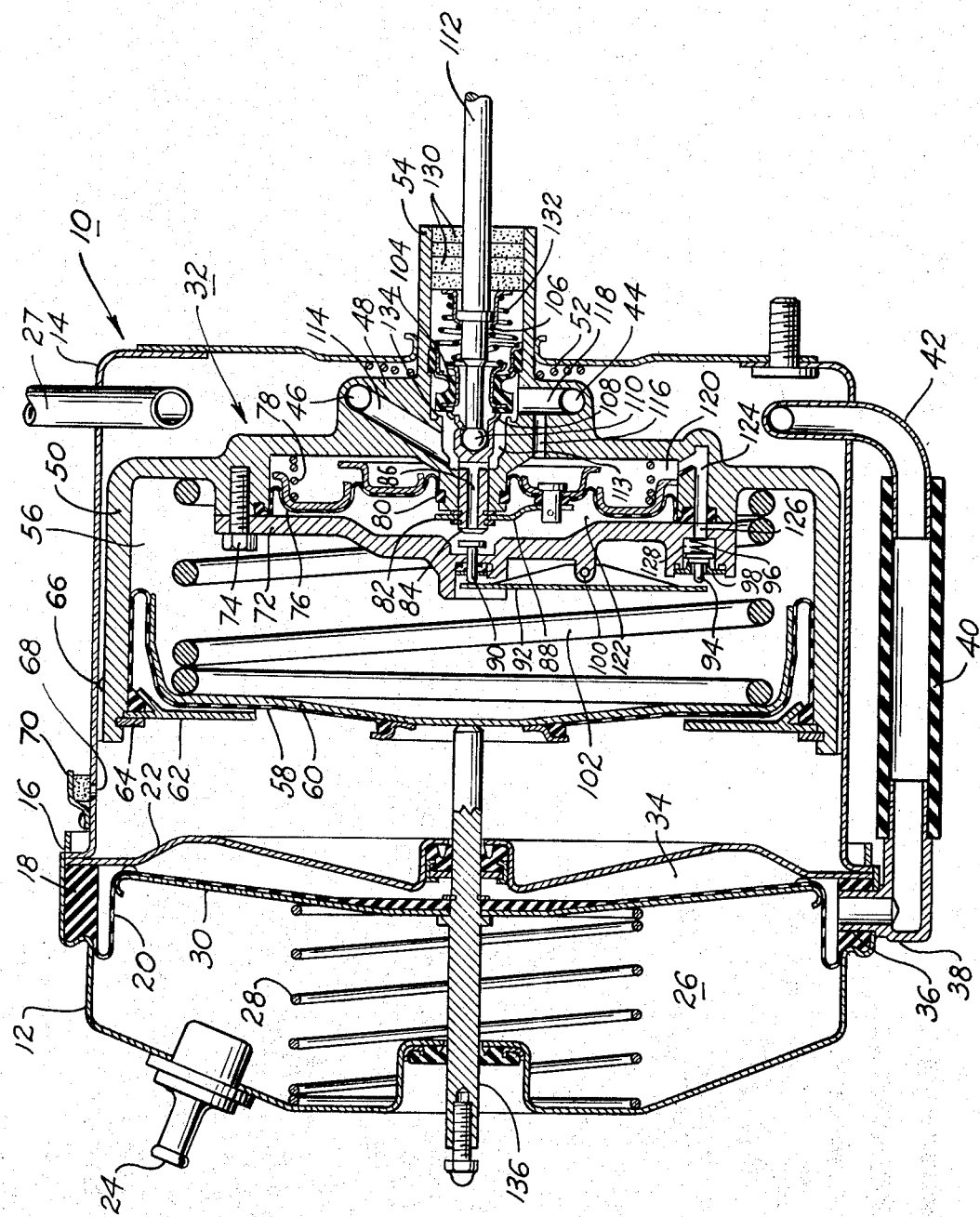
INVENTOR.
MAXWELL L. CRIPE.
BY
ATTORNEY.

United States Patent Office 3,362,297
Patented Jan. 9, 1968

3,362,297
FLUID PRESSURE SERVOMOTOR
Maxwell L. Cripe, South Bend, Ind., assignor to The Bendix Corporation, a corporation of Delaware
Filed Sept. 26, 1966, Ser. No. 581,945
7 Claims. (Cl. 91—217)

ABSTRACT OF THE DISCLOSURE

A fluid pressure servomotor having means to equalize the height of the accelerator pedal and the brake pedal within a vehicle which means comprises a slidable structure having a pressure responsive collapsible element and a spring means operatively arranged so as to position the sliding structure within the servomotor in accordance with the availability of power supply for actuation of the servomotor.

---

This invention relates to a fluid pressure servomotor having means to vary the travel of the push rod controlling the same.

Most vehicle manufacturers of present day vehicles are wisely concerned with equalizing the height of the brake pedal and the accelerator pedal in order to reduce the reaction time of an operator in shifting his right foot from the accelerator pedal to the brake pedal. Such an equalization has been made possible through the use of power brake servomotors. However, there is some concern that during the absence of power with a minimum travel available by such systems there would not be enough travel permissible for the manual application of the vehicle brakes. Therefore, it is a principal object of this invention to provide a means which will permit the equalization of accelerator pedal and brake pedal height within a power brake servomotor and upon the failure of power enable the operator of the vehicle to change the brake pedal height to have enough travel available for manual application of the brakes.

Another object of this invention is to provide a servomotor with a means sensitive to the availability of power for operating a servomotor in order to regulate the travel of the controlling member therefor.

Other objects and advantages of this invention will appear from the following description of the drawing in which there is shown a fluid pressure servomotor in section that is constructed in accordance with the principles of this invention.

With more particular regard to the drawing there is shown a servomotor 10 having a housing formed of front and rear shells 12 and 14. The shells are joined as at 16 by a twist lock connection with a beaded portion 18 of the diaphragm 20 interposed to seal the juncture. It should be understood by those skilled in the art that upon assembly the beaded portion 18 will be compressed and the inherent resiliency will maintain the joint. At the same time a partition 22 is assembled between the shell portions 12 and 14 to divide the interior of the housing into a power chamber at the forward end and a valve chamber at the rearward end.

A check valve 24 is assembled to the forward shell 12 in order to introduce a vacuum to the supply or storage chamber 26 in the power chamber of the servomotor. This check valve, as will be readily understood by those skilled in the art is communicated to the manifold of the vehicle engine by a hose or conduit of similar nature (not shown). The engine intake manifold is also communicated to a conduit 27 passing through the rear shell 14.

Prior to the assembly of the shells a return spring 28 is placed between the forward shell 12 and the diaphragm plate 30 and a movable valve structure 32 is placed within the rear shell 14.

The diaphragm 20 and diaphragm plate 30 divide the power chamber into the storage chamber 26 and a control chamber 34 between the diaphragm and the partition 22. The beaded portion 18 of the diaphragm 20 is provided with an opening in at least one place, as at 36 to receive an inlet fitting 38 that is connected by a hose 40 to an outlet pipe 42 projecting from the rear shell 14. Prior to assembly the inlet pipe 27 and the outlet pipe 42 are connected, respectively, to an inlet port 44 and a control port 46 in the rear boss 48 of the structure 50 forming the housing for the movable valve means within the rear chamber 14. Also prior to the assembly of the shells 12 and 14 a positioning spring 52 is placed about a tubular projection 54 of the boss that extends outwardly from the rear shell 14.

The movable valve structure 50 is assembled prior to its insertion within the shells 12 and 14 and the assembly thereof. The peripheral portions of the valve structure 50 is provided with guide surfaces 66 for slidably guiding the structure 50 within the shell portion 14. These surfaces are formed in the structure 50 to have axial passages to communicate either side of the structure thereby equalizing the pressure across it. In this regard it should be noted that the shell portion 14 is provided with an opening 68 over which a filter assembly is placed to provide atmospheric communication to the chamber internally of the shell portion 14 in which the structure 50 is suspended.

The structure 50 is formed with an open ended chamber 56 at one end that is closed by a diaphragm 58 and plate 60 which are assembled in the open end by an annular plate 62 retained by a snap ring 64. Prior to the assembly of the diaphragm 58 and plate 60 to the structure 50 a valve plate 72 is attached to the structure 50 by means of a plurality of bolts 74 about the periphery thereof. During this assembly a two stage reaction diaphragm 76 is placed within the cavity between the valve plate 72 and the structure 50, which two stage reaction diaphragm is biased toward the plate 72 by a counter-reaction spring 78. This reaction diaphragm 76 is provided with a central opening about which a beaded portion 80 thereof is snap fitted into a recess of a forwardly projecting boss 82 of the structure 50. The boss 82 is provided with a central opening and communicates with a central bore in the boss 48 open to the tubular projection 54 thereof.

A valve plunger 84 having an axial passageway 86 is slidably mounted within the boss 82 and by means of snap rings on either side of a reaction link 88 is connected to the reaction diaphragm 76.

The reaction plate 72 is also provided with a valve plunger 90 that is operatively associated with a lever 92 controlling a poppet valve 94 biased by a spring 96 onto a valve seat 98 carried by the plate 72. As seen, the lever 92 is pivotally attached, as at 100, to the plate 72.

Next, a coil spring 102 is placed between the plate 60 and the structure 50 to normally urge the diaphragm 58 and plate 60, which can now be assembled to the structure 50, to bear against the annular plate 62.

The tubular projection 54 is provided with an annular recess for receiving a beaded portion of a flexible poppet 104 that is urged by a spring 106 to normally abut a valve seat 108 formed on the rearward face of the valve plunger 84. The valve plunger is also provided with a spherical socket for receiving a ball 110 of a push rod 112 to unite the same together. There is thus provided a valve chamber 113 within the boss 48 that opens to a control pressure passage 114 leading to the control outlet 46. It should also be noted that the structure 50 is formed, or machined with an axial passage 116 communicating a vacuum inlet passage 118 from the vacuum inlet 44 to the reaction chamber 120. Also, the axial passage 86 within the control plunger 84 communicates the valve chamber 113 to the reaction chamber 122. The structure 50 and the valve plate 72 have matching passages 124 and 126 to communicate the reaction chamber 120 to a valve chamber 128 behind the poppet valve 94. In completing the description of the construction a plurality of filters 130 are provided in the extreme right end of the tubular projection 54 for introducing atmospheric air interiorly of the projection 54 which, in the normal released condition, is held internally of the poppet 104 by the bearing of the seat 108 thereon due to the action of the valve return spring 132.

With regard to the operation of the unit after the installation, the vehicle operator will depress a brake pedal (not shown) to move the push rod 112 inwardly of the structure 50 until the flexible poppet 104 seats on an annular valve seat 134 formed in the boss 48 of the structure 50. Further actuation or inward movement of the push rod 112 will then separate the valve seat 108 of the plunger 84 from the flexible poppet to allow the introduction of atmospheric air through the filters 130 to the control passage 114 and out the control port 46 which is connected by a hose to the pipe 42 wherefrom it is directed to the control chamber 34 to actuate the movable rod 30 and translate a force transmitting rod 136. During this first application of power after installation, the brake pedal attached to the push rod 112 will be in a high position. In order to get it to its normal low position, vacuum must be built up in the chamber 56. This vacuum is supplied from the intake manifold of the engine connected by the pipe 27 so that after the engine is started the pedal will automatically assume its normal low position. This pipe 27 is connected by a hose to the vacuum inlet 44, and, due to the check valve action of the poppet 94 being pulled off the seat 98, evacuation of the chamber 56 will begin to compress the spring 102. As the spring 102 is being compressed, the spring 52 will move the structure 50 inwardly of the shell portion 14 to a position where it will abut on the partition 22.

During the actuation of the unit the reaction diaphragm 76 will be subjected to the pressure differential due to the vacuum supplied to the chamber 120 and the atmospheric supply to the chamber 122 which will give the operator of the vehicle a proportion "feel."

If no power is available for actuation of the servomotor 10, the reaction will be eliminated and the push rod 112 will take up the space between the left end of the valve plunger 84 and the plunger 90 to pivot the lever 92 about the pivot 100 and thereby displace the poppet 94 from the seat 98. When the power failure was due to a lack of vacuum in the engine intake manifolld, it will be appreciated that the atmospheric pressure then will start flowing to the chamber 56 to permit the spring 102 to expand. This will have the effect of forcing the structure 50 to the rear while at the same time maintaining an abutting relationship with the force transmitting rod 136. This will then increase the travel available to the push rod 112 and manually actuate the force transmitting rod 136.

Having fully described a manner of construction of the invention, it is now desired to set forth the scope of protection sought by these Letters Patent as follows:

I claim:

1. A servomotor including a movable wall within a housing controlled by a push rod operated valve means with a means to regulate the travel of said push rod from minimum travel under power operation of said servomotor to maximum travel under no power actuation, said means comprising:
   a movable valve housing for said valve means within said servomotor, said housing being provided with a chamber open at one end;
   a pressure responsive wall closing the open end of said chamber;
   a first spring operatively arranged in said chamber biasing said wall outwardly of said chamber;
   a second spring operatively connecting said servomotor housing and said movable valve housing to bias said movable valve housing inwardly; and
   means to conduct a fluid power source to said chamber, said means being operatively connected to said valve means, to collapse said first spring and thereby permit expansion of said second spring to pull said push rod inwardly of said servomotor to a position where its permissible travel is only that required to operate said valve means.

2. In a servomotor having a housing and a movable wall therein controlled by a valve operated by a push rod, a means to vary the travel of said push rod comprising:
   a sliding structure within said housing behind said movable wall having a first spring biasing a diaphragm on one face and a second spring operatively arranged between the other face of said sliding structure and the housing; and
   means to create a pressure differential across said diaphragm to collapse said first spring and permit said second spring to move said structure inwardly of said housing, said means being operatively related to said valve and push rod with said push rod being operatively connected to said sliding structure to be positioned thereby.

3. A servomotor comprising:
   a housing having an axial chamber with means to introduce a first fluid pressure to each end thereof;
   a partition in said housing to create a power chamber and a valve chamber therewithin;
   a pressure responsive power wall in said power chamber having a force transmitting rod operatively connected thereto which projects forwardly from said housing and rearwardly through said partition into said valve chamber with means to bias said power wall in released attitude to the rear of said power chamber;
   a valve means in said valve chamber including a first spring biasing a diaphragm and a second spring operatively arranged between said housing and said valve means which, in cooperation with a pressure differential across said diaphragm in opposition to said first spring, acts to position said valve means toward and away from said partition in that said diaphragm abuts the force transmitting rod projecting rearwardly through said partition, and conduit means connected to said valve means communicating said first fluid pressure internally of said valve means and communicating a second fluid pressure differing from said first fluid pressure also internally of said valve means;
   passage means providing fluid pressure communication from said valve means to said power chamber on the opposite side of said power wall than that exposed to said first fluid pressure whereby said valve means can suspend said power wall in said first fluid pressure or create a pressure differential thereacross by introducing said second fluid pressure on the side of said power wall opposite to that exposed to said first fluid pressure; and
   a push rod operatively connected to said valve means.

4. A servomotor according to claim 3 wherein said valve means may be further characterized as including:
   a wall slidably arranged in said valve chamber with means to communicate pressure on one side thereof to the other, said wall having an open chamber on one side and a rearwardly projecting boss on the other with a central bore open to said chamber;
   a valve plate affixed to said wall in said chamber to close communication of said bore to said chamber, said plate having an axial plunger operatively connected to a radially located poppet valve by a lever pivotally mounted on said plate;
   a reaction means operatively arranged between said plate and said wall;
   a valve plunger operatively connected to said wall and said reaction means;

a valve poppet in said boss and operably connected to said valve plunger;

a diaphragm assembly closing said open end of said chamber in said wall, said diaphragm assembly being mounted by an annular plate to said wall which also forms a forward stop for said assembly;

a spring between said wall and said assembly to normally urge said assembly on said stop;

passage means leading from an inlet in said boss to said poppet valve and to the bore adjacent a valve seat formed internally in said boss and thence to a control port connected to the means providing fluid pressure communication to said power chamber; and a spring about said boss between it and the servomotor housing.

5. A servomotor according to claim 4 wherein said reaction means is characterized as a two stage diaphragm member dividing the space between said wall and valve plate into a first variable volume chamber and a second variable volume chamber one of which is communicated to said inlet port by a passage in said wall and the other of which is communicated to said control port by passage means through said valve plunger.

6. A servomotor according to claim 5 wherein said poppet valve is located in a passage receiving inlet pressure from said variable volume chamber open to said inlet port.

7. A servomotor according to claim 4 wherein said poppet valve is spring biased to act as a check valve.

References Cited

UNITED STATES PATENTS

| | | | |
|---|---|---|---|
| 3,048,361 | 8/1962 | Francis | 92—50 |
| 3,075,499 | 1/1963 | Prather | 91—434 |
| 3,093,119 | 6/1963 | Stelzer | 91—391 |
| 3,115,067 | 12/1963 | Ayers | 91—391 |
| 3,126,794 | 3/1964 | Ayers | 91—434 |

FOREIGN PATENTS 921,973   1/1955   Germany.

MARTIN P. SCHWADRON, *Primary Examiner.*

PAUL E. MASLOUSKY, *Examiner.*